(12) United States Patent
Sandahl

(10) Patent No.: US 8,919,669 B2
(45) Date of Patent: Dec. 30, 2014

(54) FLUID INTAKE ASSEMBLY FOR REMOTE FLUID SOURCE

(75) Inventor: Jeffrey E. Sandahl, Buffalo, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 610 days.

(21) Appl. No.: 12/754,379

(22) Filed: Apr. 5, 2010

(65) Prior Publication Data

US 2011/0240764 A1    Oct. 6, 2011

(51) Int. Cl.
| | | |
|---|---|---|
| *B05B 9/04* | (2006.01) | |
| *B05B 9/00* | (2006.01) | |
| *B65D 88/54* | (2006.01) | |
| *G01F 11/00* | (2006.01) | |
| *B05B 9/08* | (2006.01) | |
| *F16L 29/00* | (2006.01) | |

(52) U.S. Cl.
CPC ............ *B05B 9/0413* (2013.01); *B05B 9/0426* (2013.01); *B05B 9/0861* (2013.01); *F16L 29/00* (2013.01)
USPC ............ 239/332; 239/124; 222/333; 222/318

(58) Field of Classification Search
USPC .............. 222/189.1, 333, 382–385, 399, 318, 222/626, 189.11; 239/332, 124, 127, 342, 239/344, 352, DIG. 23, DIG. 14, 329, 330, 239/331, 333, 334, 126
See application file for complete search history.

(56) References Cited

U.S. PATENT DOCUMENTS

| 1,843,269 | A | | 3/1929 | Capser | |
|---|---|---|---|---|---|
| 1,839,193 | A | * | 1/1932 | Blanchard | 239/426 |
| 1,972,955 | A | * | 9/1934 | Saugman | 417/181 |
| 2,641,365 | A | * | 6/1953 | Lundeen | 210/153 |
| 2,858,965 | A | | 11/1958 | Berman | |
| 3,623,661 | A | * | 11/1971 | Wagner | 239/127 |

(Continued)

FOREIGN PATENT DOCUMENTS

| DE | 43 10 014 | 9/1994 |
|---|---|---|
| EP | 1 889 665 | 2/2008 |

(Continued)

OTHER PUBLICATIONS

International Search Report and Written Opinion for corresponding PCT application PCT/US2011/027875, dated Jul. 8, 2011.

(Continued)

*Primary Examiner* — Justin Jonaitis
*Assistant Examiner* — Chee-Chong Lee
(74) *Attorney, Agent, or Firm* — Christopher J. Volkmann; Kelly, Holt & Christenson, PLLC

(57) ABSTRACT

The present disclosure generally relates to fluid spraying devices and systems and more specifically, but not by limitation, to a fluid intake assembly configured to be used with a remote fluid source to supply fluid material from the remote fluid source to a fluid sprayer. In one example, a fluid intake assembly for a fluid sprayer is provided. The assembly includes an inlet tube providing at least a portion of a fluid path between a remote fluid source and the fluid sprayer. The assembly also includes a fluid flow control mechanism configured to allow a flow of fluid material in the fluid path in a first direction and restrict a flow of fluid material in the fluid path in a second, opposite direction. In one example, the fluid flow control mechanism comprises a valve mechanism.

5 Claims, 5 Drawing Sheets

(56) References Cited

U.S. PATENT DOCUMENTS

| | | | |
|---|---|---|---|
| 3,714,967 A | | 2/1973 | Zupan et al. |
| 4,093,107 A | | 6/1978 | Allman et al. |
| 4,147,306 A | * | 4/1979 | Bennett ........................ 239/327 |
| 4,156,505 A | * | 5/1979 | Bennett ........................ 239/327 |
| 4,184,778 A | | 1/1980 | Terrels |
| 4,260,107 A | | 4/1981 | Jackson |
| 4,315,317 A | | 2/1982 | Orchard et al. |
| 4,405,088 A | | 9/1983 | Gray |
| 4,467,961 A | | 8/1984 | Coffee et al. |
| 4,705,995 A | | 11/1987 | Boll |
| 4,782,982 A | * | 11/1988 | Ellison ........................... 222/1 |
| 4,804,109 A | | 2/1989 | Vanderjagt |
| 4,919,650 A | | 4/1990 | Feingold et al. |
| 5,027,661 A | | 7/1991 | Desaulniers et al. |
| 5,086,491 A | | 2/1992 | Cuneo |
| 5,395,051 A | | 3/1995 | Anderson et al. |
| 5,443,569 A | * | 8/1995 | Uehira et al. ................. 222/190 |
| 5,574,657 A | | 11/1996 | Tofte et al. |
| 5,626,259 A | | 5/1997 | Maas et al. |
| 5,639,219 A | | 6/1997 | Conatser |
| 5,860,574 A | | 1/1999 | Shanklin et al. |
| 5,979,715 A | | 11/1999 | Emrick |
| 6,207,052 B1 | | 3/2001 | Webb |
| 6,488,846 B1 | | 12/2002 | Marangi |
| 6,540,119 B1 | | 4/2003 | Bensussan et al. |
| 6,719,058 B2 | | 4/2004 | Salama et al. |
| 6,821,096 B2 | | 11/2004 | Kosmyna et al. |
| 6,833,072 B1 | | 12/2004 | Krestine et al. |
| 6,935,542 B2 | | 8/2005 | Harrity et al. |
| 7,102,303 B2 | | 9/2006 | Brotto |
| 7,446,493 B2 | | 11/2008 | Forster et al. |
| 7,559,438 B2 | | 7/2009 | Kosmyna et al. |
| 7,631,789 B2 | | 12/2009 | Dodd et al. |
| 2004/0262417 A1 | | 12/2004 | Proch |
| 2005/0150521 A1 | | 7/2005 | Jones et al. |
| 2005/0236498 A1 | | 10/2005 | Cunningham |
| 2006/0049099 A1 | | 3/2006 | Chang |
| 2007/0000948 A1 | | 1/2007 | Adler et al. |
| 2008/0217361 A1 | | 9/2008 | Vitantonio et al. |
| 2011/0240765 A1 | | 10/2011 | Sandahl |

FOREIGN PATENT DOCUMENTS

| | | |
|---|---|---|
| FR | 2 602 437 | 2/1988 |
| GB | 1 176 840 | 1/1970 |
| WO | 02/07897 | 1/2002 |
| WO | 2010/047800 | 4/2010 |

OTHER PUBLICATIONS

International Search Report and Written Opinion for PCT application PCT/US2011/027876, dated Jul. 7, 2011.

Titan Airless Spray Technology Pro-Finish Series Manual, Dec. 1999, 6 pages.

U.S. Appl. No. 12/754,370, filed Apr. 5, 2010, Application and Drawings 21 pages.

U.S. Appl. No. 12/774,504, filed May 5, 2010, Application and Drawings 26 pages.

Wagner Optimus Plus Project Power Painter Owner's Manual, http://www.wagnerspraytech.com, 19 pages, dated Jan. 2009.

International Search Report and Written Opinion for PCT Application No. PCT/US2011/027870, dated Sep. 9, 2011, 12 pages.

Application and Drawings from U.S. Appl. No. 12/754,209, filed Apr. 5, 2010. 20 pages.

Prosecution history from U.S. Appl. No. 12/754,209; Including Requirement for Restriction/Election dated Jun. 8, 2012, Response to Election/Restriction filed Jun. 22, 2012, Non-Final Rejection dated Oct. 24, 2012, Amendment filed Jan. 11, 2013, Final Rejection dated Apr. 29, 2013, and Amendment with RCE filed May 30, 2013. 61 pages.

Prosecution history from U.S. Appl. No. 12/774,504; including Preliminary Amendment filed Feb. 25, 2011, Requirement for Restriction/Election dated Sep. 26, 2012, Response to Election/Restriction filed Oct. 2, 2012, Non-Final Rejection dated Nov. 30, 2012, Amendment filed Feb. 1, 2013, Final Rejection dated Apr. 11, 2013, Response filed May 15, 2013, Final Rejection dated May 31, 2013, Amendment with RCE filed Jul. 16, 2013, and Non-Final Rejection dated Ma 28, 2014. 88 pages.

Office Action from U.S. Appl. No. 12/754,209, dated Sep. 8, 2014. 19 pages.

Amendment from U.S. Appl. No. 12/774,504 dated Aug. 21, 2014. 8 pages.

* cited by examiner

FLUID INTAKE ASSEMBLY FOR REMOTE FLUID SOURCE

BACKGROUND

An exemplary fluid sprayer comprises a spray-coating system having a device configured to spray fluid material (e.g., paint, ink, varnish, stain, texture, herbicides, pesticides, food products, etc.) through the air onto a surface. The fluid material is typically provided from a fluid container by a fluid intake assembly. Fluid intake assemblies can use pressure feed, gravity feed, and/or suction feed mechanisms, for example. In one exemplary airless paint spraying system, a suction tube assembly extends into a paint container to provide paint material to a pump mechanism of a handheld fluid sprayer, which delivers pressurized paint to an output nozzle or tip.

Examples of paint containers include containers attached to a body of a paint sprayer and remote containers that are physically separated from the paint sprayer. For instance, an exemplary suction tube assembly for use with a remote paint container comprises a suction set having one or more tube fittings for inlet and/or return tubes. The inlet and/or return tubes extend from the suction set of the paint sprayer to the remote paint container and have a length sufficient to allow movement of a user about a work site, for instance. Tube lengths often reach several feet or more.

The discussion above is merely provided for general background information and is not intended to be used as an aid in determining the scope of the claimed subject matter.

SUMMARY

The present disclosure generally relates to fluid spraying devices and systems and more specifically, but not by limitation, to a fluid intake assembly configured to be used with a remote fluid source to supply fluid material from the remote fluid source to a fluid sprayer.

In one exemplary embodiment, a fluid intake assembly for a fluid sprayer is provided. The assembly includes an inlet tube providing at least a portion of a fluid path between a remote fluid source and the fluid sprayer. The assembly also includes a fluid flow control mechanism configured to allow a flow of fluid material in the fluid path in a first direction and restrict a flow of fluid material in the fluid path in a second, opposite direction.

In one exemplary embodiment, a dual tube connection assembly for a fluid sprayer is provided. The assembly includes a first fitting configured to receive an inlet fluid tube providing at least a portion of an inlet fluid path from a remote fluid container to the fluid sprayer. The assembly also includes a second fitting configured to receive a return fluid tube providing at least a portion of a return fluid path from the fluid sprayer to the remote fluid container. The assembly also includes a valve mechanism configured to control a flow of fluid in the inlet fluid path.

In one exemplary embodiment, a fluid sprayer is provided and includes a fluid sprayer body, a motor configured to actuate a fluid pump mechanism, and a dual tube connection assembly coupled to a portion of the fluid sprayer body. The dual tube connection assembly is configured to receive an inlet fluid tube providing an inlet fluid path from a fluid container and a return fluid tube providing a return fluid path to the fluid container. The dual tube connection assembly includes a valve mechanism configured to allow a flow of fluid through the inlet fluid path in a first direction and restrict a flow of fluid through the inlet path in a second, opposite direction.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
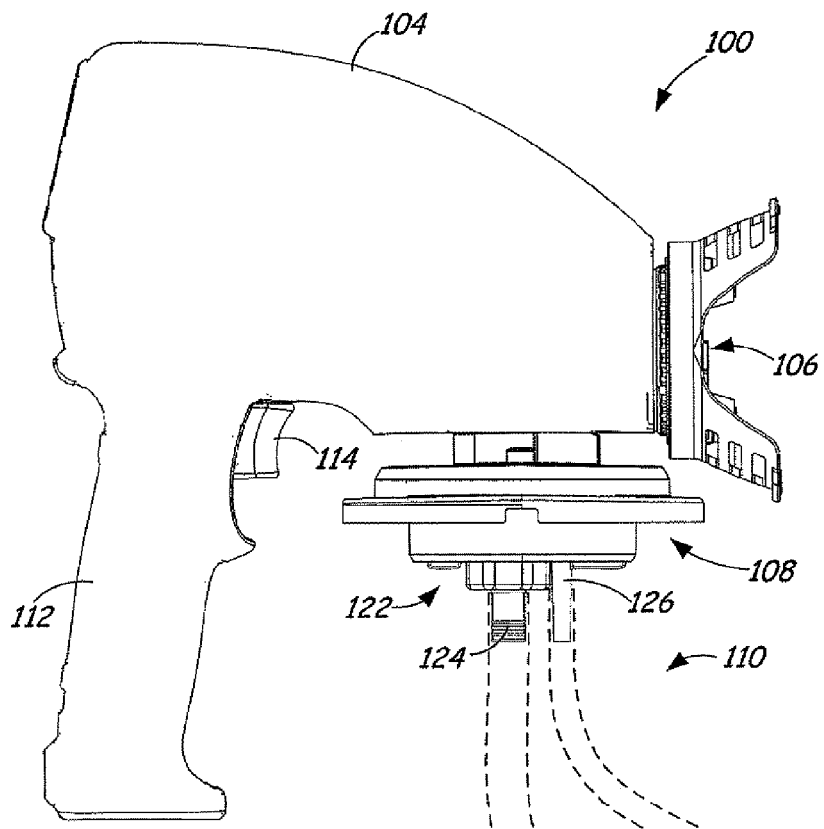
FIG. 1 is a side view of an exemplary fluid sprayer.
Figure 1:
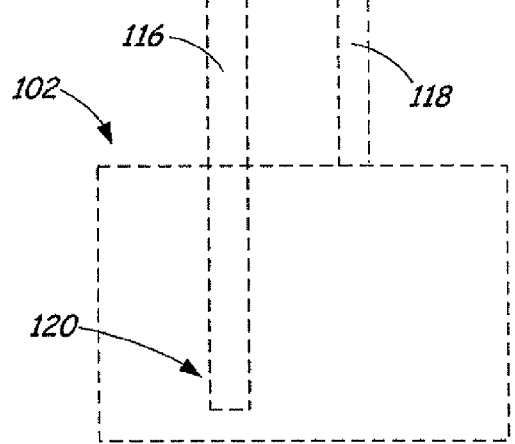

FIG. 1 illustrates an exemplary fluid sprayer 100 configured to spray a fluid material, supplied from a fluid container, through the air onto a surface. As used herein, "fluid material" refers to a liquid material such as, but not limited to, paints, varnishes, stains, food products, pesticides, inks, and the like. In the embodiment illustrated in FIG. 1, sprayer 100 comprises a handheld paint spray gun configured to spray atomized paint materials; however, sprayer 100 can include other configurations and can be utilized to spray other types of fluid material.

Spray gun 100 illustratively comprises an airless system and uses a pump mechanism for pumping the paint material from a paint source. In other embodiments, spray gun 100 can comprise an air-driven or air-assisted system. In one embodiment, the paint source comprises a fluid container attached to spray gun 100. In the embodiment illustrated in FIG. 1, the paint source comprises a remote fluid container (generally represented in FIG. 1 by block 102) that is physically separated from spray gun 100. By way of example, fluid container 102 can comprise a paint pail or paint can positioned on a floor at a work site.

Spray gun 100 includes a housing 104 containing electrical components for controlling operation of spray gun 100 and an electric drive or motor operably coupled to drive a pump mechanism. The pump mechanism delivers paint supplied from container 102 to an output nozzle 106 having a particular size and shape for generating a desired spray pattern.

A fluid intake assembly 110 provides paint from remote container 102 to housing 104. In the embodiment illustrated in FIG. 1, fluid intake assembly 110 comprises a suction tube assembly having an inlet suction or siphon tube 116 and a return tube 118. An inlet end 120 of suction tube 116 is disposed proximate a bottom surface of container 102. While embodiments are described herein in the context of a suction tube assembly, it is noted that other types of fluid intake mechanisms can be utilized such as, but not limited to, pressure feed mechanisms, gravity feed mechanisms, and/or other types of mechanisms.

Assembly 110 comprises a dual tube connection assembly 122 having a first fitting 124 configured to receive suction tube 116 and a second fitting 126 configured to return tube 118. Dual tube connection assembly 122 is removably couplable to a portion 108 of spray gun 100. In one embodiment, connection assembly 122 is coupled to portion 108 using threaded connections (e.g., portion 108 comprises a rotatable collar having threads configured to engage corresponding threads on connection assembly 122). In other embodiments, connection assembly 122 is coupled to portion 108 using any suitable type(s) of connection mechanisms including, but not limited to, latches, clamps, clasps, pins, snaps, and the like. In one embodiment, connection assembly 122 is interchangeable with other types of connection components. For instance, connection assembly 122 can be removed and replaced with a connection assembly for use with fluid containers that are directly attached to spray gun 100. By way of example, portion 108 can comprise a fluid container cover to which a fluid container is removably couplable. Cover 108 is supported by housing 104 and/or motor/pump assembly disposed within housing 104.

Spray gun 100 also includes handle 112 and trigger 114 that enable a user to hold and control the operation of spray gun 100. A power source (not shown in FIG. 1) supplies power for spray gun 100. For example, the power source can comprise a power cord connected to an AC power source, such as a wall outlet. In another example, the power source can comprise a battery pack. An exemplary battery pack can include primary (e.g., non-rechargeable) batteries and/or secondary (e.g., rechargeable) batteries. The battery pack can be mounted to spray gun 100 (for example, to handle 112) or can be external and connected to spray gun 100 through a power cord.

During operation, when the fluid pump mechanism slows or stops (for example, when the user releases trigger 114) suction in the inlet tube 116 is reduced. The weight of the fluid material in the inlet tube 116 can cause the fluid material to flow back toward the fluid container 102 (especially with a long inlet tube 116). This flow of fluid material toward the fluid container 102 can result in air being drawn into assembly 122 and/or inlet tube 116 from sprayer 100 (for example, through the nozzle and/or pump mechanism of the fluid sprayer 100). In airless fluid spraying systems and the like, air within the fluid flow can cause sputtering or spitting of the paint material and uneven spray from the output nozzle. Such results are undesirable to the user. In accordance with embodiments described below, a dual tube connection assembly is provided including one or more fluid flow control mechanisms, such as a valve mechanism, configured to prevent or limit air from being drawn into the inlet fluid path.

Figure 2:
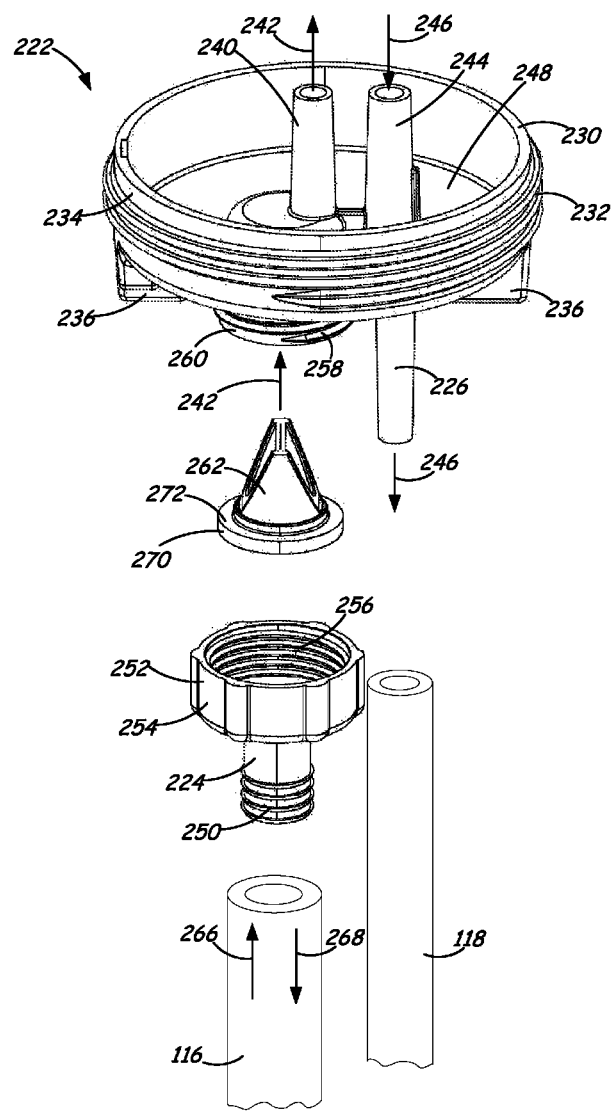
FIGS. 2 and 3 are exploded perspective views of a dual tube connection assembly, under one embodiment.
Figure 3:
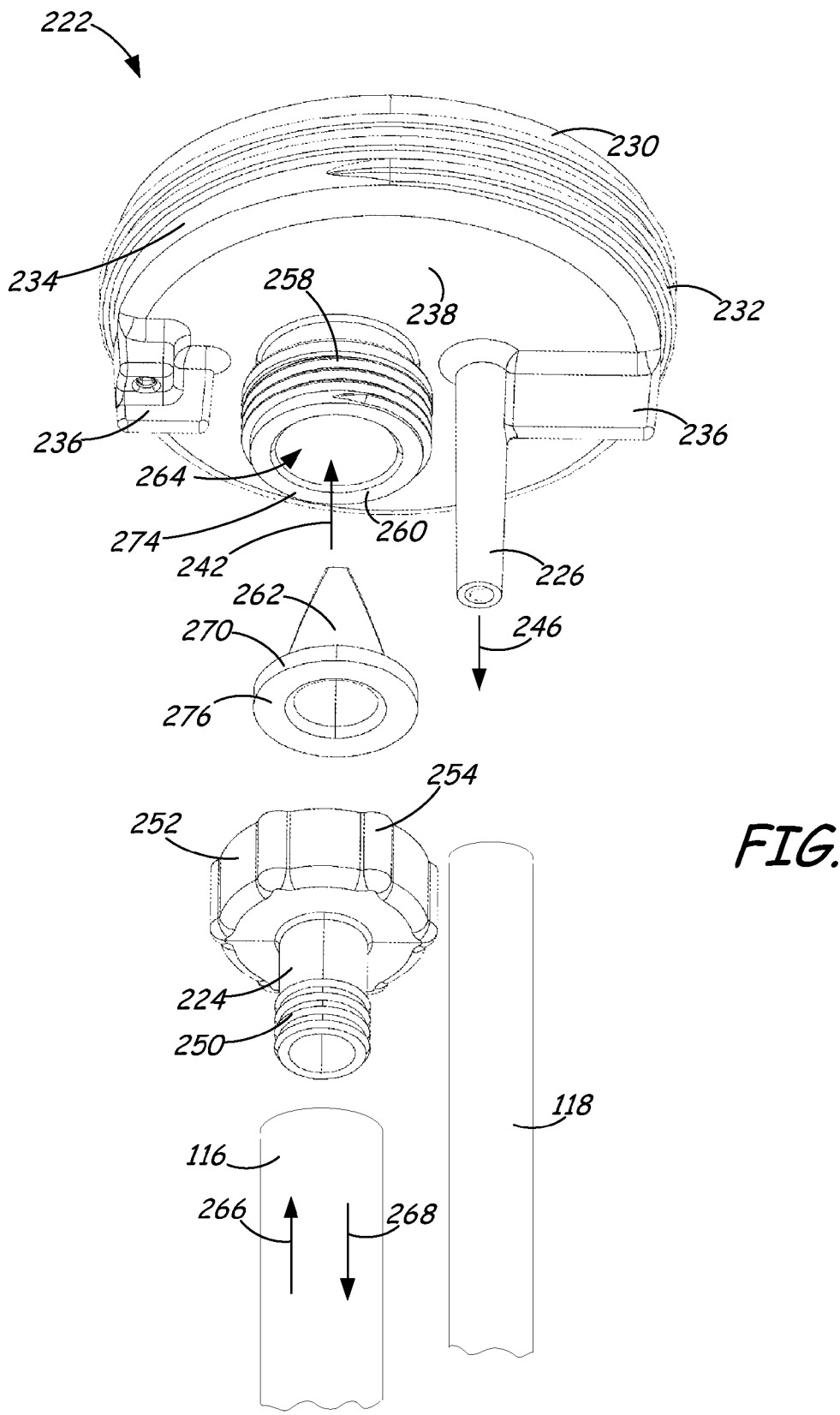

FIGS. 2 and 3 are exploded perspective views of a dual tube connection assembly 222 for use with a fluid intake assembly (i.e., assembly 110), under one embodiment. Dual tube connection assembly 222 comprises a main body 230 that is removably coupleable to a portion (e.g., cover 108) of spray gun 100. In the illustrated embodiment, body 230 comprises threads 232 disposed about the outer periphery 234 of body 230. Threads 232 are configured to engage corresponding threads on the portion of spray gun 100. Body 230 can include one or more tabs (illustratively a pair of tabs) 236 that extend from a bottom surface 238 of body 230. Tabs 236 provide a gripping surface for a user during connection/disconnection of body 230 to spray gun 100, for example. While body 230 is illustrated as including threads for connections to spray gun 100, it is noted that other types of connection mechanisms can be utilized to connect dual tube connection assembly 222 to spray gun 100.

Body 230 includes a first tube or conduit 240 providing an inlet fluid flow (generally represented by arrow 242) into spray gun 100 and a second tube or conduit 244 receiving a return fluid flow (generally represented by arrow 246) from spray gun 100. The inlet fluid flow 242 comprises fluid material received from a remote fluid container through suction tube 116 and the return fluid flow comprises fluid material returned to the remote fluid container through return tube 118. Tubes 240 and 244 extend from a top surface 248 of body 230 toward the spray gun 100. In one embodiment, tubes 240 and 244 are received within corresponding ports formed in spray gun 100.

First and second tube fittings 224 and 226 are configured to accommodate suction tube 116 and return tube 118, respectively. In one embodiment, one or more of tube fittings 224 and 226 comprise barbs or ribs 250 to retain the corresponding tube(s) thereon. In the illustrated embodiment, fitting 224 comprises a plurality of radially protruding frusto-conical barbs or ribs that engage the inner surfaces of suction tube 116. Alternatively, or in addition, fasteners such as clamps and the like can be utilized to secure tubes 116 and/or 118.

In the illustrated embodiment, tube fitting 224 comprises a portion of a coupler 252 that is removably attachable to body 230. Coupler 252 comprises a female receptacle or socket 254 having threads 256 configured to accommodate threads 258 of a corresponding male connector 260 of body 230. Connector 260 extends from the bottom surface 238 of body 230 and is configured to receive coupler 252 thereon.

In accordance with one embodiment, dual tube connection assembly 222 comprises a valve mechanism 262 positioned in the inlet fluid flow path (i.e., the fluid flow path formed by suction tube 116, coupler 252, connector 260, and tube 240). Valve mechanism 262 is configured to regulate a flow of fluid material through assembly 222 and is retained in an inner chamber or compartment 264 formed in connector 260 by coupler 252. Examples of valve mechanism 262 include, but are not limited to, check valves, flat valves, ball valves, reed valves, and the like. In the illustrated embodiment, valve mechanism 262 comprises a duckbill valve that is configured to allow fluid material to flow through the inlet fluid path in a first direction (generally represented by arrow 266) and restrict or prevent fluid flow in a second direction (generally represented by arrow 268).

In the illustrated embodiment, valve mechanism 262 includes an annularly extending portion 270 having a first surface 272 configured to engage a surface 274 of connector 260 and a second surface 276 configured to engage a surface of coupler 252. This engagement of surfaces 272 and 276 to connector 260 and coupler 252 can limit or prevent leakage of fluid material around valve mechanism 262.

During use of spray gun 100, a user ceases or suspends operation by releasing trigger 114. For instance, the user releases trigger 114 when coming to the end of a work surface (i.e., the end of a wall, the edge of a window or door, etc.). In another instance, the user stops operation of spray gun 100 to refill the fluid container, for example in response to a low fluid level indication. Preferably, operation of spray gun 100 is stopped to refill the fluid container before the amount of fluid material in the container falls below a level where the inlet end of the suction tube is exposed to air. In one example, a fluid level indicator is provided on spray gun 100 indicating to the user that the fluid level in the container is at or below a threshold level. One example of a fluid level indicator is described in commonly assigned, co-pending U.S. patent application Ser. No. 12/754,209, filed on Apr. 5, 2010, and titled FLUID LEVEL INDICATOR IN AN AIRLESS FLUID SPRAYER, which is hereby incorporated by reference in its entirety.

During operation of spray gun 100, valve mechanism 262 allows the inlet flow of fluid material (i.e., in direction 266). When the user releases trigger 114 (which slows or stops the fluid pump mechanism), valve mechanism 262 restricts or prevents fluid material in the inlet fluid path from flowing back toward the fluid container (i.e., in direction 268). In this manner, valve mechanism 262 retains the fluid material in the inlet fluid path and can operate to prevent air from being drawn into the inlet fluid path. When the user subsequently resumes operation, spray gun 100 operates with little or no air in the fluid inlet flow.

Figure 4:
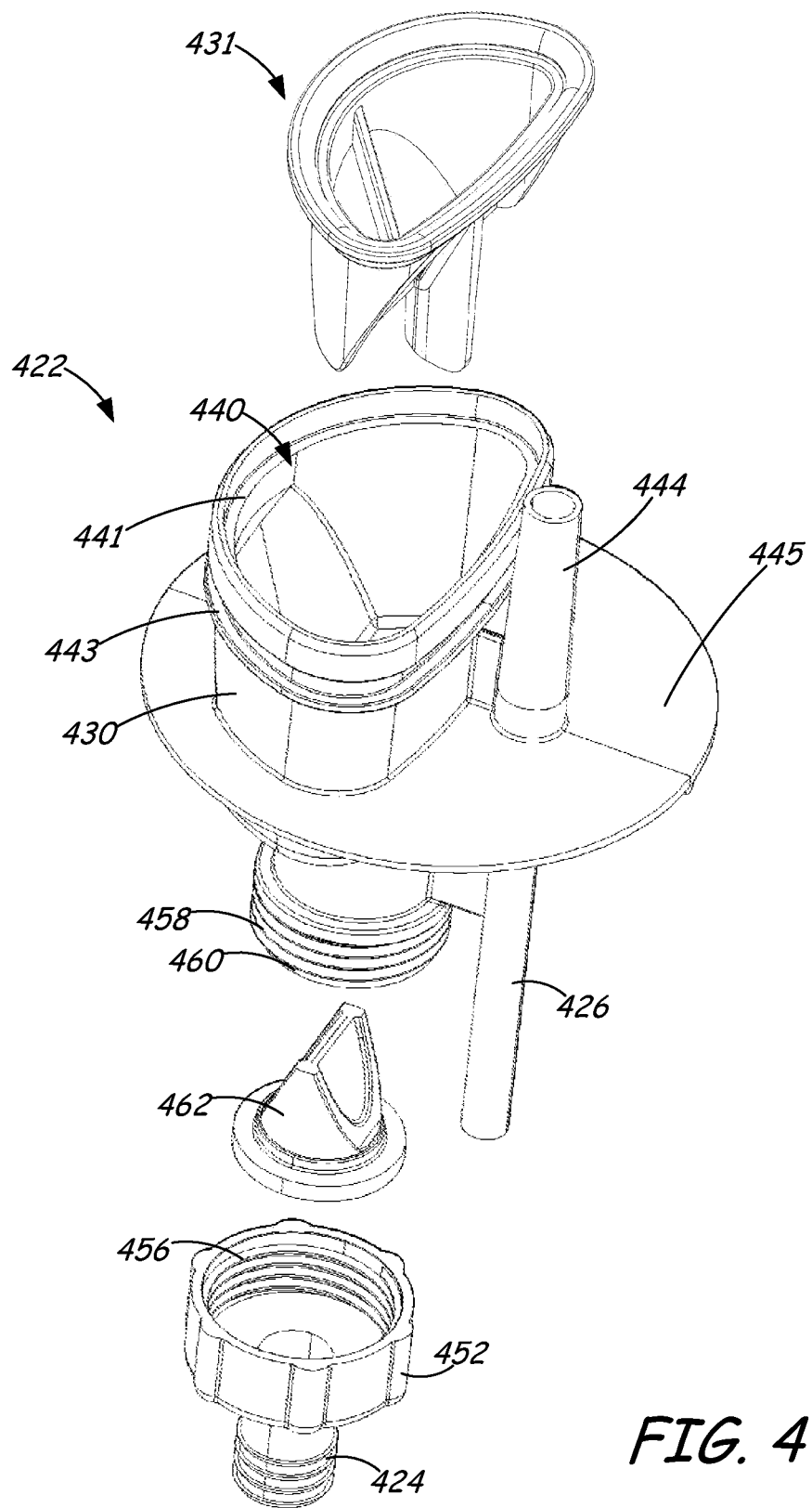
FIGS. 4 and 5 are exploded perspective views of a dual tube connection assembly, under one embodiment.
Figure 5:
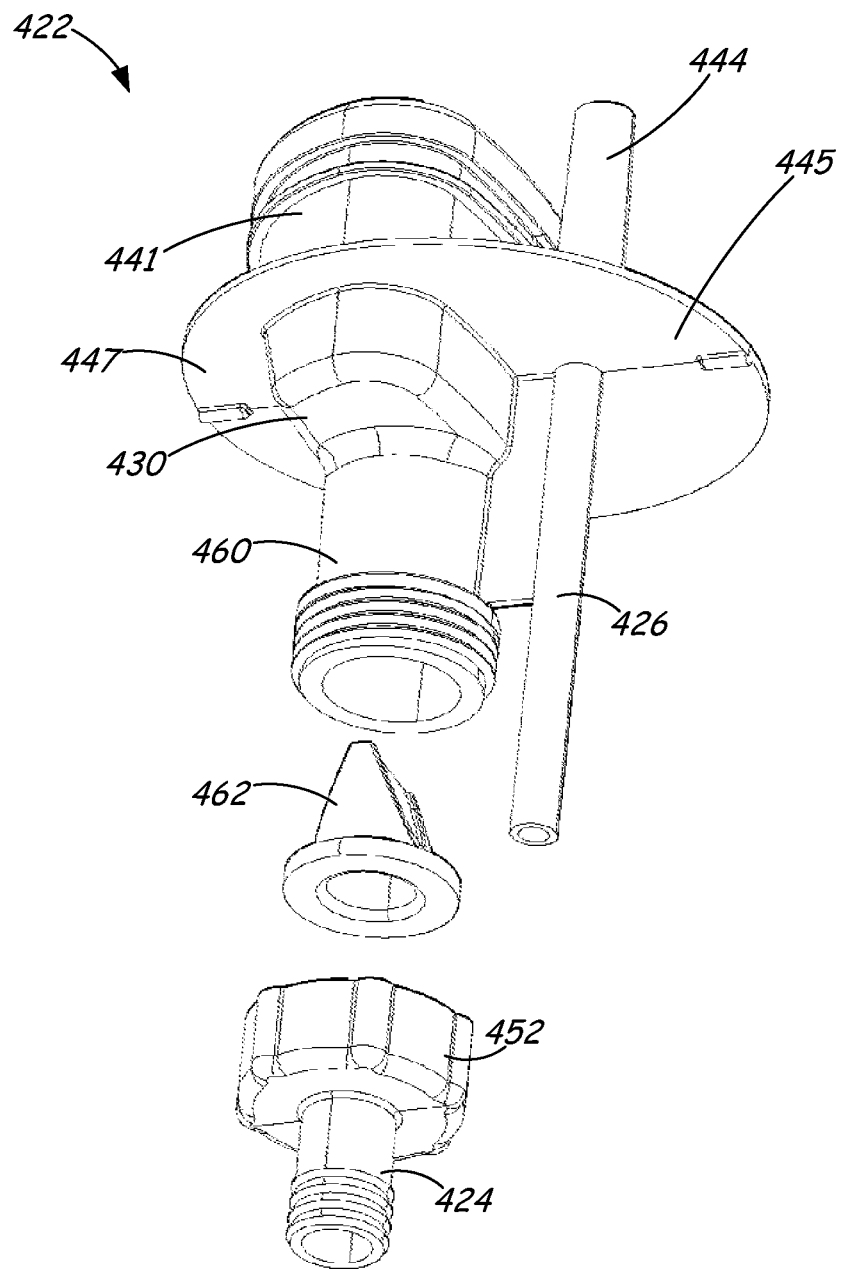

FIGS. 4 and 5 are exploded perspective views of a dual tube connection assembly 422, under one embodiment. Assembly 422 includes a main body 430 and fittings 424 and 426 configured to receive suction tube 116 and return tube 118, respectively. Fitting 424 comprises a portion of a coupler 452 that is configured to removably engage a connector 460 of body 430. In the illustrated embodiment, coupler 452 and connector 460 include threads 456 and 458 and are similar to coupler 252 and connector 260, illustrated in FIGS. 2 and 3. A valve mechanism 462 is retained within connector 460 by coupler 452. In one embodiment, valve mechanism 462 is substantially similar to valve mechanism 262, illustrated in FIGS. 2 and 3.

Body 430 includes a tube or conduit 444 extending toward and received by a fluid return port of spray gun 100. Tube 444 and fitting 426 form a return fluid flow path from spray gun 100 to return tube 118.

In the illustrated embodiment, body 430 is sized to accommodate a fluid filter 431 within a compartment 440 formed by an upwardly extending wall 441. The fluid filter 431 is positioned in the inlet fluid flow path between valve mechanism 462 and spray gun 100. Alternatively, or in addition, assembly 422 can be configured such that a valve mechanism is positioned between the fluid filter 431 and spray gun 100.

Fluid filter 431 is positioned closer to the pump mechanism of spray gun 100 as compared to fluid intake assembly configurations having the fluid filter disposed in the fluid container (e.g., positioned at an end of the suction tube in the fluid container). Positioning the fluid filter closer to the pump mechanism can improve the fluid suction capabilities (e.g., a reduce pressure drop along the fluid path).

In one embodiment, a portion (e.g., portion 108) of spray gun 100 engages the outer periphery 443 of body 430. A seal is formed between body 430 and the portion of spray gun 100. For instance, a sealing member, such as a mechanical gasket material, extends along the outer periphery 443 and is configured to engage the portion of spray gun 100. In one embodiment, spray gun 100 can comprise a downwardly extending wall forming a compartment sized to accommodate body 430 therein. The downwardly extending wall engages the outer periphery 443 of body 430.

Body 430 can be attached to spray gun 100 using any suitable attachment mechanism(s). In one embodiment, body 430 can include one or more fasteners configured to engage spray gun 100. For instance, a locking mechanism can be provided that extends toward and engages a recess or aperture formed in spray gun 100. In the illustrated embodiment, body 430 includes a planar portion 445 having a circular, or substantially circular, shape. A collar (not shown) is utilized to secure portion 445 to spray gun 100. In one embodiment, the collar engages a bottom surface 447 of portion 445 and includes threads configured to engage corresponding threads on spray gun 100. It is noted that this is one example for securing assembly 422 to spray gun 110. Any suitable connection structures and mechanisms can be utilized.

While various embodiments of the invention have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the system or method while maintaining substantially the same functionality without departing from the scope and spirit of the present disclosure and/or the appended claims.

What is claimed:

1. A paint sprayer comprising:
   a spray gun comprising:
      a housing;
      a paint pump mechanism within the housing; and
      a motor configured to actuate the paint pump mechanism; and
   a dual tube connection assembly comprising:
      a main body removably couplable to the spray gun;
      a coupler removably attached to a connector of the main body and having an inlet tube fitting configured to receive an inlet paint tube for providing an inlet paint path from a paint container;
      a return tube connection configured to receive a return paint tube for providing a return paint path to the paint container; and
      a valve mechanism retained at least partially within the main body by the coupler and comprising;
         a valve configured to allow a fluid to flow through the inlet paint tube in a first direction and restrict the fluid from flowing through the inlet paint tube in a second, opposite direction; and
         an annularly extending portion extending from the valve, the annularly extending portion having;
            a first surface directly engaging a surface of the connector of the main body; and
            a second surface directly contacting and forming a sealing engagement with a surface of the coupler to limit fluid flow around the valve mechanism.

2. The paint sprayer of claim 1, wherein the main body further comprises a compartment is configured to accommodate a fluid filter between the valve mechanism and the paint pump mechanism.

3. A handheld paint sprayer comprising:
   a housing having a paint pump mechanism;
   an electric drive configured to actuate the paint pump mechanism; and
   a paint intake assembly comprising:
      an assembly body removably couplable to the housing of the paint sprayer and having a removable coupler that includes an inlet tube fitting;
      a flexible, elongate inlet tube configured to provide an inlet paint path from a remote paint source that is remote from the paint sprayer;
      a fluid flow control mechanism retained at least partially within the main body by the removable coupler and having:
         a valve portion retained in a chamber of the assembly body and disposed between the flexible, elongate inlet tube and the paint pump mechanism and configured to allow fluid to flow in the inlet paint path in a first direction and restrict the paint from flowing in the inlet paint path in a second, opposite direction; and
         an annularly extending portion contacting and forming a sealing engagement with an outer surface of the assembly body, and
      a return tube configured to provide a return paint path to the remote paint source.

4. The handheld paint sprayer of claim 3, wherein the chamber configured to accommodate a fluid filter in the inlet paint path.

5. The handheld paint sprayer of claim 3, wherein the removable coupler is engaged to the main body using a threaded connection.

* * * * *